(12) United States Patent
Lamminmäki et al.

(10) Patent No.: US 8,840,814 B2
(45) Date of Patent: Sep. 23, 2014

(54) PROCESS OF PREPARING ALKALI METAL TITANATES

(75) Inventors: Ralf-Johan Lamminmäki, Ulvila (FI); Margit Rajamäki, Pori (FI); Merja Kruunari, Pori (FI)

(73) Assignee: Sachtleben Pigments Oy, Pori (FI)

(*) Notice: Subject to any disclaimer, the term of this patent is extended or adjusted under 35 U.S.C. 154(b) by 535 days.

(21) Appl. No.: 13/127,323

(22) PCT Filed: Nov. 4, 2008

(86) PCT No.: PCT/FI2008/050628
§ 371 (c)(1),
(2), (4) Date: Jul. 7, 2011

(87) PCT Pub. No.: WO2010/052362
PCT Pub. Date: May 14, 2010

(65) Prior Publication Data
US 2011/0278495 A1    Nov. 17, 2011

(51) Int. Cl.
| | |
|---|---|
| H01B 1/08 | (2006.01) |
| H01M 4/485 | (2010.01) |
| C01G 23/00 | (2006.01) |
| B82Y 30/00 | (2011.01) |
| H01M 10/0525 | (2010.01) |

(52) U.S. Cl.
CPC .......... *C01G 23/005* (2013.01); *C01P 2004/64* (2013.01); *H01M 10/0525* (2013.01); *C01P 2006/80* (2013.01); *C01P 2006/12* (2013.01); *C01P 2006/10* (2013.01); *H01M 4/485* (2013.01); *C01P 2006/82* (2013.01); *C01P 2004/61* (2013.01); *C01P 2002/72* (2013.01); *Y02E 60/122* (2013.01); *B82Y 30/00* (2013.01); *C01P 2004/62* (2013.01)
USPC ...................................... 252/520.21; 423/608

(58) Field of Classification Search
CPC ...... H01B 1/08; C01G 23/005; C01G 23/104; C01D 15/02; H01M 4/88
USPC .......... 252/520.2, 520.21; 423/598, 608, 642, 423/69, 179
See application file for complete search history.

(56) References Cited

U.S. PATENT DOCUMENTS

| | | | | |
|---|---|---|---|---|
| 6,139,815 A | * | 10/2000 | Atsumi et al. | ................. 423/598 |
| 6,827,921 B1 | | 12/2004 | Singhai et al. | |
| 2011/0223491 A1 | * | 9/2011 | Xu et al. | ........................ 429/338 |

FOREIGN PATENT DOCUMENTS

| | | |
|---|---|---|
| EP | 0444798 B1 | 5/1995 |
| EP | 1409409 B1 | 12/2004 |
| JP | 09-309728 | 2/1997 |
| JP | 09-309727 A | 12/1997 |
| WO | 2010052362 A1 | 5/2010 |

OTHER PUBLICATIONS

English Machine Translation for JP 09 309727A; 9 pages.

(Continued)

*Primary Examiner* — Mark Kopec
(74) *Attorney, Agent, or Firm* — Gearhart Law, LLC

(57) ABSTRACT

A lithium titanate product, the formula of which is in the form of $Li_xTi_yO_z$, and wherein y is 1, the x:y molar is 1.1-1.8, while the z:y molar ratio is 2.0-4.5. Also disclosed is a method of preparing alkali metal titanates, such as lithium titanate, at a low temperature of below 100° C., from an aqueous titanium-containing slurry and an alkali metal compound.

14 Claims, 11 Drawing Sheets

(56) References Cited

OTHER PUBLICATIONS

International Preliminary Report on Patentability for International Patent Application No. PCT/FI2008/050628; filed Nov. 4, 2008, 7 pages.

International Search Report and Written Opinion for International Patent Application No. PCT/FI12008/050628; Mailing Date: Aug. 6, 2009, 13 pages.

Reply to Written Opinion for International Patent Application PCT/FI2008/050628; filed Nov. 4, 2008, 3 pages.

* cited by examiner

PROCESS OF PREPARING ALKALI METAL TITANATES

CROSS REFERENCE TO RELATED APPLICATIONS

This is a U.S. national stage of application No. PCT/FI2008/050628; filed on Nov. 4, 2008; the disclosure of which is also incorporated herein by reference.

BACKGROUND OF THE INVENTION

The invention relates to a process of preparing alkali metal titanates. In particular, the invention relates to a lithium titanate product that has a high Li:Ti molar ratio, and the use thereof.

Various lithium titanates and their properties have been studied extensively due to the potential use of the material in battery applications. Lithium titanate is used as an anode electrode material, since a high energy density is provided with it and it is rechargeable. Typically, lithium batteries are used in consumer and entertainment electronics, such as computers, mobile phones and cameras.

The lithium ions in the lithium titanate settle in a $TiO_2$ crystal lattice, forming an $Li_xTiO_2$ form in an octahedral anatase structure, at its easiest. The goal is to run as many lithium ions as possible into the structure, but their number is however limited by the repulsive, coulombic interactions between the lithium ions in the structure. It has been suggested that the maximum amount of Li in a $TiO_2$ anatase crystal is $x=0.5-1$, depending on the temperature and the method of synthesis.

Lithium titanates have previously been prepared in various ways; particularly, through solid-state reactions that take place at high temperatures of 200-1000° C. Typically, the products thus provided are comprised of tetralithium titanate $Li_4Ti_5O_{12}$. Additionally, various titanates that have a Li:Ti ratio, such as various $Li_xTi_yO_4$ structures, wherein the x:y varies within 0.5-2 and, and for example, the $Li_4TiO_4$ and $Li_2Ti_3O_7$ structures, as well $Li_xTi_yO_{12}$, have been prepared, whereby $x=3-5$ and $y=4-6$, and $Li_2TiO_3$, for example. It is a known fact that when the ratio of lithium to titanium increases to two, such as in the $Li_2TiO_3$ structure, the usability of the material in battery or accumulator applications decreases. This is due to the fact that after the first discharge of the battery, oxide is generated, to which the Li ion can no longer be returned. Instead, it has been observed that an $LiTiO_2$ type of structure, which has $O_3$ levels that enable the movement of lithium, is functional, although its Li:Ti ratio remains low. Other possible lithium titanate structures are disclosed, for example, in the publications ICDD 1998, ISSN 1084-3116, Powder Diffraction File, Release 1998: Datasets 1-48 plus 70-85.

In the article Zhang, D. et al., J. Ind. Eng. Chem., vol. 13, No. 1, 2007 p. 92-96, nano-crystalline $LiTiO_2$ has been synthesized by a hydrothermal process. In this process, $LiOH.H_2O$ was dissolved in ion-exchanged water and the solution was mixed with $TiO_2$ powder (Degussa P25). The mixture was placed in an autoclave and heated to 180° C., and to a corresponding pressure for 24 hours, after which it was cooled in air, filtered and washed with water and acetone. In this way, cubic $LiTiO_2$ was provided, its lattice constant thus being 4.14 Å, and its average crystal size was about 30 nm. The Li:Ti ratio of the product thus obtained is one at the maximum, whereby the Li content remains relatively low. The process cannot be used to flexibly adjust the crystal size of the generated product. Furthermore, the production conditions, such as the high temperature and pressure, are not the best possible regarding safety, when operating in an industrial environment.

The article Wagemaker, M. et al. J. Am. Chem. Soc. 2007, 129, 4323-4327 describes the effect of the particle size on the insertion of lithium into $TiO_2$ single anatase crystals. In the study, $TiO_2$ powder was dispersed in hexane, and n-butyl lithium was added to the mixture, while slowly stirring. The stirring was continued for 3 days, after which the mixture was filtered, washed with hexane and dried. All of the production stages were carried out in an argon cabinet. In this way, $Li_xTiO_2$ was obtained, wherein $x=0$, 0.12, 0.4 or 0.8. Furthermore, it was observed that along with a decrease in the crystal size, it was possible to increase the amount of lithium. The largest amount of lithium was run into the $TiO_2$ crystal structure, when the crystal size was the lowest possible, 7 nm, whereby the composition corresponded to the formula $Li_1TiO_2$, and the crystal structure had a tetragonal I4l/amd symmetry. In a product according to the description, the amount of Li still remains low, and the production conditions are not easy to implement industrially.

The Patent Specification EP1409409 discloses the production of tetralithium titanate, $Li_4Ti_5O_{12}$, the particle size of which can be adjusted to within 5 and 2000 nm, and its BET is 1-400 $m^2/g$. In the production method, a mixture is formed that contains a titanium compound and a lithium compound. This mixture is evaporated to form the mixture of titanium compound and lithium compound. The evaporation is carried out by spray-drying the mixture at a temperature that is higher than the boiling point of the medium of the mixture, preferably water, i.e., over 100° C., but still lower than the temperature, at which the reaction between the lithium and titanium compounds essentially takes place. The titanium compound can be titanium oxychloride or, according to the examples, titanium chloride, or an amorphous oxidized titanium compound, such as titanium dioxide. The lithium compound can be lithium chloride, lithium oxychloride, lithium nitrate, lithium hydroxide or a mixture thereof. The mixture provided by the evaporation is calcined to produce a reaction between the lithium and titanium and to form the lithium titanate product.

The abstract of the Patent Specification JP09309727 (WPINDEX AN: 1998-071742 [07]) describes the production of laminate-structured, elongated lithium titanate particles from titanic acid and a lithium compound from an ammonium compound-bearing aqueous solution at a temperature of 50° C. The presence of ammonia has a desired effect on the morphology of the compound that is precipitating, but ammonia easily causes process-technical problems, when evaporating readily as ammonia when the pH raises to above 7, and the nitrogen contained in the used solution forms an environmental problem in further processing.

The purpose of the present invention is to disclose a lithium titanate product that has a high lithium content.

Another purpose of the present invention is to provide a low-temperature process for the production of alkali metal titanates on an industrial scale, and for the production of the said lithium titanate product, in particular.

SUMMARY OF THE INVENTION

The first aspect of the invention provides a lithium titanate product. The second aspect of the invention discloses a process of preparing alkali metal titanates. The third aspect of the invention provides a lithium battery.

The inventors of the present invention have surprisingly observed that by using aqueous, titanium-containing slurries, which are generated in the production of titanium dioxide, an alkali metal titanate product, such as lithium titanate, which contains plenty of alkali metal, such as lithium, is provided in a simple and effective manner and at a low temperature, when the titanium-bearing slurry is reacted at a temperature of below 100° C. with an alkali metal compound, such as lithium hydroxide.

The present invention enables the production of a new product that has a high lithium content. This product is particularly well-suited to the storage applications of electric energy, such as batteries, wherein the high content of lithium that works as a charge carrier is directly proportional to the ability of the battery to charge electric energy. Furthermore, the process according to the invention uses processing conditions and raw materials, which are suitable for the industrial scale and which are as safe and simple as possible. The process also enables the preparation of products with low production energy without having to use high temperatures and/or pressures.

DETAILED DESCRIPTION OF THE INVENTION

According to its first aspect, the invention provides a lithium titanate product, the formula of which is in the form of $Li_xTi_yO_z$, wherein, when y is 1, the molar ratio x:y is 1.1-1.8 and, at the same time, the z:y molar ratio is 2.0-4.5. The x:y molar ratio is preferably 1.3-1.8, the x:y molar ratio is most preferably 1.3-1.7, when y is 1. Correspondingly, for the oxygen-titanium ratio, the z:y molar ratio is preferably 3.0-4.0, more preferably 3.1-3.9.

The molar ratio can be determined by any known manner by measuring the Li and Ti contents, for example, by an ICP-OES analyzer, such as PerkinElmer Optima 4300DV or the like, and by thereafter defining the amount of oxygen on an annealed sample on the basis of weighing. The annealing loss is determined as follows: The moisture is determined by weighing a known amount of sample, which is dried to a constant weight at 110±3° C. The moisture of the sample is calculated from the loss of material. The known amount of sample is annealed at 1000±30° C. The annealing loss of the sample is calculated from the loss of material by observing the portion of moisture. The molar ratio of the product can be adjusted by the mutual relation of the reagents that are used in the production.

According to a preferred embodiment, the crystal size of the lithium titanate according to the formula is 15-40 nm, preferably 20-30 nm.

According to another preferred embodiment, the specific surface area, BET, of the obtained product is 10-200 m2/g, preferably 25-140 m2/g, more preferably 25-100 m2/g.

Depending on the production conditions, for example, cubic or tetragonal mixed crystal structures can be provided. To achieve a pure tetragonal crystal structure, the obtained lithium titanate must be heat-treated.

The lithium titanate product is extremely pure, containing minor amounts of impurities only; these include sodium, of which there is typically less than 0.5% by weight, preferably less than 0.2% by weight, most preferably 0.15% by weight or less; sulphur, of which there is typically less than 0.12% by weight, preferably 0.05% by weight or less, more preferably 0.01% by weight or less; and chlorine, of which there is typically 0.01% by weight or less.

According to a preferred embodiment, it can be stated, on the basis of the x-ray powder diffraction determination (XRD), that no reflection peaks originating from the source material, such as titanium dioxide, can be observed in the generated end product, which peaks would prove that there is some source material still left. Supposedly, the reaction into lithium titanate has thus been completed. Preferably, no reflections caused by anatase titanium oxide or rutile titanium dioxide could be observed from the measured XRD results. A conclusion can thus be made that the amount of anatase or rutile titanium dioxide is at least below 5% by weight, preferably below 1% by weight.

Figure 1:
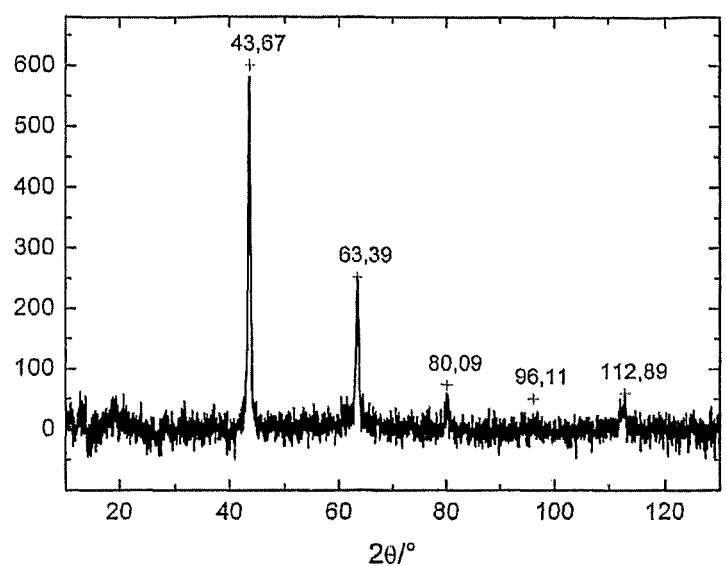
FIG. 1 shows a lithium titanate product according to the invention, its formula being in the form of LixTiyOz, wherein, when y is 1, the molar ratio x:y is 1.1-1.8 and, at the same time, the molar ratio z:y is 2.0-4.5 and the x-ray powder diffractogram in the two-theta angle range of 10-135°.

In the x-ray powder diffraction, the lithium titanate product according to the invention preferably has reflections at angles of about 43.7°, 63.4°, 80.1°, 96.1 and 112.9° 2 theta, wherein variations within the measuring accuracy can be ±0.5°, depending on the processing of the sample before the measurement, the crystallinity of the sample and the performance of the measuring equipment. The relative intensities of the peaks are preferably about 100%, 40%, 15%, 5% and 10%, respectively. The x-ray powder diffractogram is determined by using a Cu pipe (Cu Kα), 40 kV/40 mA, in the two-theta angle range of 10-135°, the scale spacing 0.02° and the time per scale division 1.0 s. Furthermore, an x-ray powder diffractogram according to FIG. 1 is preferably obtained from the lithium titanate product according to the invention.

According to a preferred embodiment, the lithium titanate product according to the invention has a volume distribution d50 of the particle size measurement of 15 μm or less, wherein d50 means, as is well-known, that 50% of the particles of the volume distribution have a diameter smaller than the numerical value in question.

The lithium titanate product according to the invention is preferably prepared by a low-temperature synthesis from an aqueous solution, preferably at below 100° C., at normal pressure and in a normal atmosphere. The conditions and chemicals used are particularly well-suited to industrial production, and no exceptional precautions, such as an inert protective gas, are needed when processing them.

In the process according to the second aspect of the invention, alkali metal titanate is prepared through the following stages (i)-(iv):

(i) an aqueous titanium-containing slurry is prepared, with which (ii) an alkali metal compound is mixed, whereby a mixture is generated, and (iii) the mixture thus generated is allowed to react into alkali metal titanate at a temperature of 20-1000° C. by agitating it at normal pressure for 20 hours maximum, after which (iv) the alkali metal titanate product thus provided is dried.

In the process according to the invention, an aqueous titanium-containing slurry is prepared, such as the slurry of a titanium compound, which reacts with the alkali metal compound, forming alkali metal titanate, while they are in contact with each other for a sufficiently long time, water preferably acting as a medium. The mixing is suitably such that the dispersion thus generated remains homogeneous, and no settling takes place. The mixing speed may be, for example, 20-200 rpm, depending on the reactor size and the mixer that are used. It is essential that the mixing is sufficiently good for the reaction to be as complete as possible. For other respects, the way of mixing is not critical.

The reaction medium is preferably water. The water essentially originates from the slurry of the titanium compound. As the medium, an alcohol solution can also be used, or additives can be used in the medium, which improve the solubility of the starting materials, for example.

The alkali metal compound can be formed by a single alkali metal or it can be a mixture of several alkali metal compounds, or a mixed compound. The alkali metal compound is preferably a soluble lithium compound, such as lithium salt. However, many salts have harmful effects in the form of impurities, such as sulphate residues, nitrogen residues or chloride residues. The lithium compound is more preferably lithium hydroxide or lithium carbonate. The lithium compound is most preferably lithium hydroxide, such as LiOH.H2O, which has a reasonable price and adequate reactivity.

According to an embodiment, the alkali metal compound is added at the stage (ii) in an alkalimetal(Me)-titanium(Ti) molar ratio that approximately corresponds to the intended molar ratio of the final structure; Me:Ti is preferably 1.1-2.0, preferably 1.1-1.9, more preferably 1.3-1.8, most preferably 1.3-1.7, whereby the intended molar ratio Me:Ti of the end product is about 1.5. When required, a medium, preferably water, is further added to the mixture to facilitate stirring.

According to a preferred embodiment, the alkali metal compound is lithium hydroxide, whereby the Li:Ti molar ratio of the lithium hydroxide and the aqueous titanium-containing slurry, which are mixed, is 1.1-1.9, preferably 1.1-1.8, more preferably 1.3-1.8, most preferably 1.3-1.7, whereby Li can be recovered as effectively as possible in a structure, the intended Li:Ti ratio of which is about 1.5.

Keeping the reaction temperature high at the stage (iii) shortens the reaction time required. The mixture can be allowed to react into alkali metal titanate at a temperature that is below 100° C., preferably 75° C. maximum, more preferably 65° C. maximum, most preferably 55° C. maximum. The temperature can be close to the room temperature, preferably at least 20° C., more preferably at least 30° C., most preferably at least 40° C., whereby hardly any extra separate heating is needed, a lesser amount of energy is consumed and the production costs decrease. The crystal size also slightly decreases, e.g., to below 15%.

Depending on the amount, quality, mixture and reaction temperature of the reacting compounds, a reaction time shorter than 20 hours is also sufficient, preferably 3 hours maximum, more preferably 2 hours maximum, most preferably 1 hour maximum, such as 30 minutes maximum. By a suitable optimization of the time and temperature, the energetically most advantageous operating range for the process is reached, and savings are obtained in the production costs.

According to an embodiment, the alkali metal compound, preferably lithium hydroxide, is added in solid form to the titanium-containing slurry, whereby it dissolves in the medium of the slurry, such as water. When required, the alkali metal compound, such as lithium hydroxide, can be first dissolved in water before combining it with the titanium-containing slurry.

According to a preferred embodiment, the aqueous titanium-containing slurry of the stage (i) contains sodium titanate. The slurry is more preferably essentially comprised of sodium titanate.

Sodium titanate can be prepared by means of alkali precipitations or by hydrolyzing from various known titanium compounds, such as titanium halides, alcohols or organotitanium compounds, which, however, are generally difficult-to-handle and expensive starting materials, possibly bringing impurities to the process.

According to an embodiment, sodium titanate is any known stable sodium titanate that has properties, which render it suitable to be used under the conditions according to the invention. Sodium titanate is preferably in the form of the $Na_xTi_yO_z$ formula. X, y and z are more preferably according to those shown in Table 1, as is well known.

Figure 9:
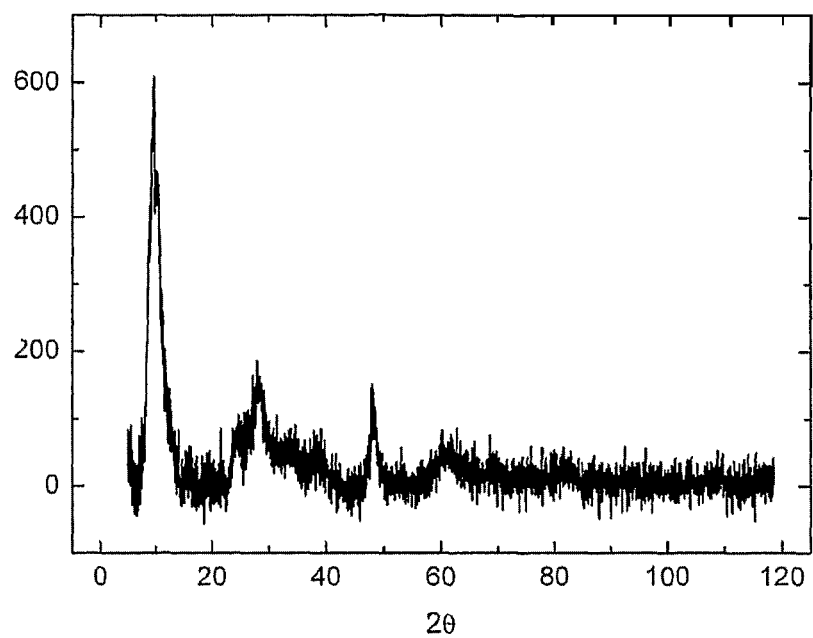
FIG. 9 shows the x-ray powder diffractogram of an NaxTiyOz compound.

In x-ray powder diffraction measurements, it has been observed that the sodium titanate according to the invention has most preferably its characteristic reflections at angles of about 10°, about 24°, about 28° and about 48° 2 theta, as shown in FIG. 9.

According to a preferred embodiment, the sodium titanate is in the form of $Na_4Ti_9O_{20}$, $Na_4Ti_9O_{20} \cdot H_2O$ or $Na_{(4-x)}H_xTi_9O_{20}$, wherein x represents the dissolved amount of Na and OH ions.

TABLE 1

|   | min | max | min | CAS registration number | max | CAS registration number |
|---|---|---|---|---|---|---|
| x | 0.1 | 20 | $Na_{0.23}TiO_2$ | 33-1295 22-1404 | $Na_{16}Ti_{10}O_{28}$ | 76-0686 |
| y | 0.2 | 20 | $Na_4Ti_{0.3}O_{2.6}$ | 28-1153 | $Na_2Ti_{12}O_{25}$ | 80-0467 |
| z | 2.0 | 30 | $NaTiO_2$ | 16-0251 | $Na_{16}Ti_{10}O_{28}$ | 76-0686 |

According to another preferred embodiment, sodium titanate is prepared from the titanium dioxide hydrate that is provided by a sulphate process in the production of titanium dioxide, by processing it with alkali into a sodium titanate slurry. Sodium titanate is more preferably prepared from an ilmenite concentrate by means of sulphuric acid, by hydrolyzing the titanium dioxide hydrate, which is elutriated in water to a density of 300-400 g/l into a titanium dioxide hydrate slurry, which is boiled with alkali at a pH that is above 11, into a sodium titanate slurry, from which the soluble sulphate salts are washed out and which is filtered. Sodium titanate is most preferably prepared in the way that is described in more detail in the previous patent EP444798 of the applicant, which is incorporated herein by reference.

According to an embodiment, sodium titanate is elutriated in water into a slurry with a density of 100-800 g/l, more preferably 100-600 g/l, whereby mixing is facilitated, depending on the particle size and/or shape of the sodium titanate that is shown, most preferably 150-450 g/l, such as 150-350 g/l.

According to another preferred embodiment, the aqueous titanium-containing slurry of the stage (i) is prepared from the titanyl sulphate provided by the sulphate process in the production of titanium dioxide, preferably by an alkali precipitation or hydrolysis. The aqueous titanium-containing slurry of the stage (i) is more preferably prepared from the titanyl sulphate that is provided by the sulphate process in the production of titanium dioxide from an ilmenite concentrate by means of sulphuric acid, by a thermal hydrolysis into titanium dioxide hydrate, which is elutriated in water into a titanium dioxide hydrate slurry with a density of 300-400 g/l. The aqueous titanium-containing slurry of the stage (i) is most preferably prepared from titanium dioxide hydrate slurry in the way described above, in the manner described in the previous patent EP444798 of the applicant, which is incorporated herein by reference.

From the dried product obtained from the stage (iv), the crystal structure and crystal size can be measured by an x-ray diffraction, and the specific surface area, the particle size and the particle size distribution, as well as the chemical analyses on the most important components, such as Li and Ti, and impurities, such as Na, S and Cl, as described above. A large particle size is advantageous regarding the processability, since dust formation in that case is minor. Depending on the application, it may be necessary to carry out coating with a material, for example, whereby a small particle size is preferable.

According to a preferred embodiment, the finished titanate product is dried at a raised temperature, preferably at a temperature of below 250° C., more preferably below 200° C., most preferably below 155° C., such as 110° C. or less. For the drying, a known device is used, such as a reel oven, spray drying, vacuum drying, a vertical drying furnace or a rotating drying furnace, which is known in the field and which is best-suited to the respective scale and production capacity.

The dried alkali metal titanate product provided by the process described above is preferably further processed by heat-treating it at a temperature of 350-1050° C., more preferably at a temperature of 500-1050° C., most preferably at a temperature of 700-900° C., such as 700-800° C., to change its crystal structure. The titanate that is provided before the heat treatment, preferably lithium titanate, is essentially cubic or, depending on the production conditions, partly cubic and partly of another crystal form. In the heat treatment, the crystal size can be essentially changed into another, e.g. tetragonal form. When the titanate product is heat-treated, it preferably changes into a spinel-form tetralithium titanate, $Li_4Ti_5O_{12}$, at a temperature of 700-800° C., the treating time being over an hour, preferably 1.5 hours or more.

The invention also discloses a lithium titanate product, which is characterized in that it is prepared by the process described above.

According to the third aspect of the invention, a lithium battery is provided, containing any of the products according to the above description, such as the product according to Claims 1-5 or 20. The product thus obtained has the advantage of a high Li:Ti ratio, higher than that of the $LiTiO_2$ structure, which has been discovered to be active; however, the ratio remains below two, as in the $Li_2TiO_3$ structure, which has been discovered to be inactive.

In the following, the invention is described in detail by means of examples. The purpose of the examples is not to limit the invention.

Examples

The Li:Ti ratios presented in the examples have been determined in a prior-art way by accurately weighing 100 g of the sample to be assayed in a teflon vessel and adding 10 ml of concentrated analysis-grade hydrofluoric acid. The vessel was heated in a sand bath until the sample has dissolved. The cooled solution was diluted to 50 ml with de-ionized water. For the determination, the sample was diluted 1:20 with 10% analysis-grade hydrochloric acid.

The lithium and titanium concentrations of the thus prepared sample were determined using a PerkinElmer Optima 4300DV ICP-OES analyser at the emission wavelengths 670.784 nm, 610.362 nm and 460.308 nm for lithium and 334.945 nm, 336.125 nm and 337.282 nm for titanium.

The particle size of the particles generated can be determined using applicable equipment, such as the Malvern Mastersizer 2000 apparatus. Specific surface area may be determined using any equipment that is known in the field, such as the Quantachrome Corp. NOVA 3200 version 6.11 apparatus which was used in the measurements below.

Example 1

Titanium dioxide production by the sulphate process was initiated by reacting ilmenite concentrate with sulphuric acid. The solid reaction cake that was generated was dissolved by means of water and waste acids. Impurities were removed and iron sulphate was crystallized out. The titanium-containing solution was concentrated and the titanium dioxide hydrate was precipitated by hydrolysis. This precipitate material was washed in several stages to render it free of salts.

About 10 tonnes of washed titanium dioxide hydrate precipitate material, expressed as $TiO_2$, was elutriated with water to a density of 300-400 g/l, the aim being 350 g/l. The slurry thus created was made strongly alkaline, pH>11, by adding about 15 tonnes of NaOH in the form a 700 g/l NaOH solution at 60° C. The temperature of the slurry was raised to 95° C. and the slurry was agitated at this temperature for two hours. During the treatment, the titanium dioxide hydrate material reacted with the lye, forming solid sodium titanate, from which sulphate ions were removed by washing the slurry with hot water for so long that sulphates were no longer found in the filtrate by barium chloride precipitation.

The sulphate-free sodium-bearing filtrate cake was elutriated in water so that the concentration of the slurry, expressed as titanium dioxide, was about 200 g/l and heated to 60° C. under continuous agitation. The pH of the slurry was then adjusted to the target value of 6 by adding concentrated hydrochloric acid (20% by weight). The slurry was processed at 60° C. under continuous agitation for 120 minutes. The pH was kept at 6 throughout the treatment. The precipitate was filtered and washed with warm water.

The obtained precipitate was re-elutriated in water so that the concentration of the slurry, expressed as titanium dioxide, was about 300 g/l. Solid lithium hydroxide ($LiOH.H_2O$) was added to the slurry at 38.4 g/50 g $TiO_2$, corresponding to an Li/Ti molar ratio of 1.5. Water was added as required to facilitate mixing. The slurry is heated to 50° C. at which temperature it was processed under continuous agitation for 40 minutes. The slurry was divided into two parts, with one part being dried at 150° C. in a vertical drying furnace for 120 minutes and the other at 200° C. in corresponding circumstances.

Figure 2:
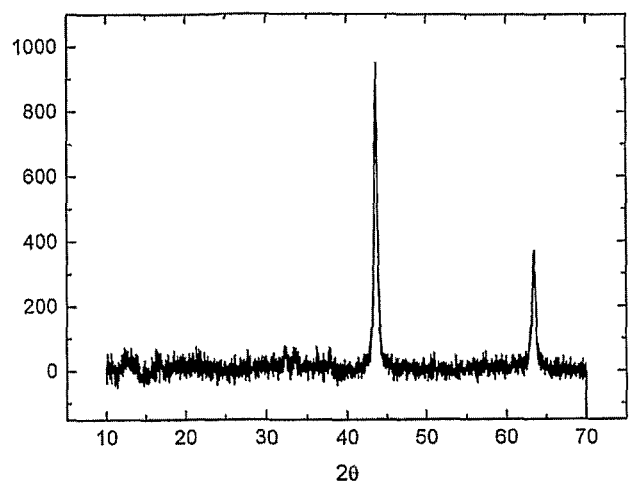
FIG. 2 shows the x-ray powder diffractograms of lithium titanate products that have the LixTiyOz formula, wherein the molar ratio x:y is 1.5, A (drying at 150° C.) and B (drying at 200° C.).
Figure 2:
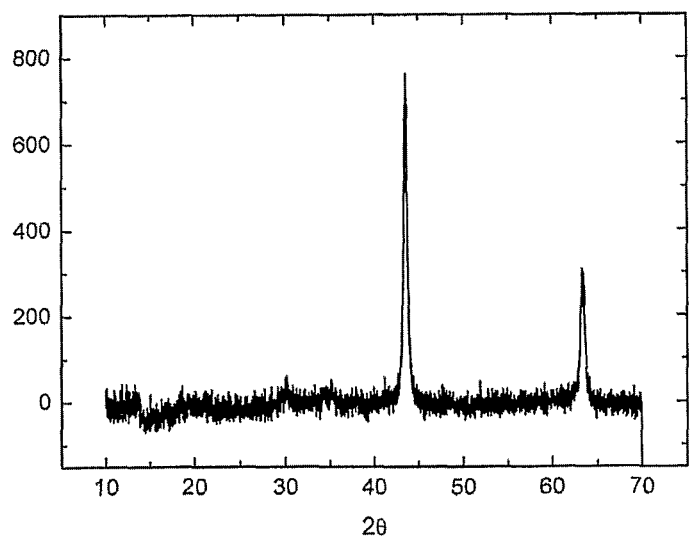

Crystal form and size of the dried powders were determined using a Philips XRD apparatus in the two-theta angle range of 10-70°. According to the X-ray diffraction analysis, the desired crystalline lithium titanate with an average crystal size of about 25 nm was formed in both samples, and no effect of drying temperature can be seen. Peaks characteristic of anatase are not present in FIG. 2 A (150° C.) or B (200° C.).

The sample that had been dried at 200° C. was processed further by washing it with plenty of water and drying at 105° C. until dry. Particle size and specific surface area were determined on an unwashed sample and Li, Ti, S and Cl concentrations and X-ray powder diffractogram and specific surface area on a washed sample (Table 2).

TABLE 2

| Analysis | 200° C. washed | 200° C. unwashed |
|---|---|---|
| Li, % by weight | 6.6 | |
| Ti, % by weight | 38 | |
| Li/Ti, mol | 1.5 | |
| Na, % | 0.15 | |
| S, % | 0.01 | |
| Cl % | <0.01 | |
| Moisture content % | 3.0 | |
| Specific surface area [m$^2$/g] | 67.0 | 37.8 |
| Particle size distribution d$_{50}$ [µm] | | 8.4 |
| Particle size distribution d$_{90}$ [µm] | | 42.0 |

As shown by the example, the product was generated at a low temperature of about 50° C. using a short reaction time and sodium titanate as starting material.

Example 2

Lithium titanate was produced as described in Example 1, except that the addition of lithium hydroxide was followed by division of the sample into two parts, with the first part being agitated at room temperature overnight (for about 20 hours) and the second part in a water bath at 60° C. overnight, respectively. Both samples were dried in a rotating drying furnace at 200° C. for 120 minutes.

Figure 3:
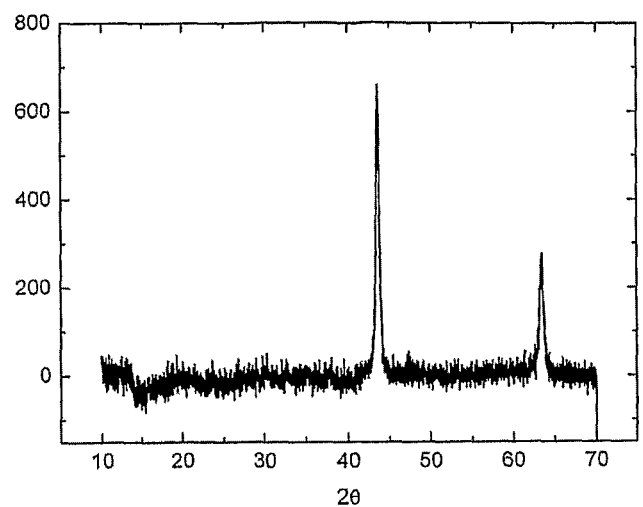
FIG. 3 shows the x-ray powder diffractograms of lithium titanate products that have the LixTiyOz formula, wherein the molar ratio x:y is 1.42 and 1.39 and, at the same time, the z:y molar ratio in both samples is 3.4, A (reaction at 25° C.) and B (reaction at 60° C.).
Figure 3:
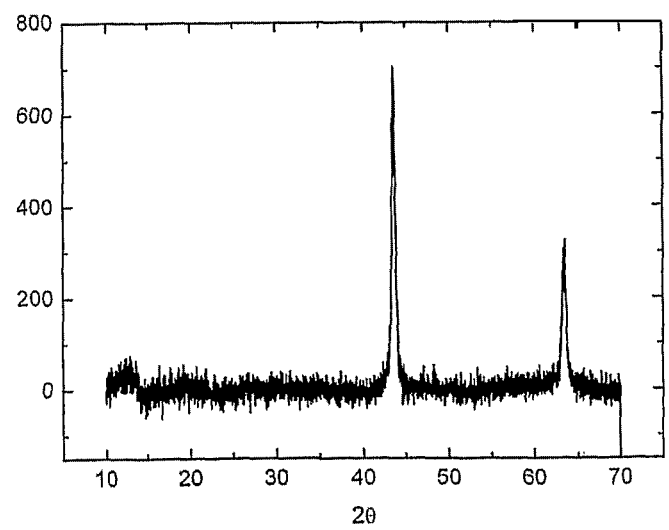
Figure 4:
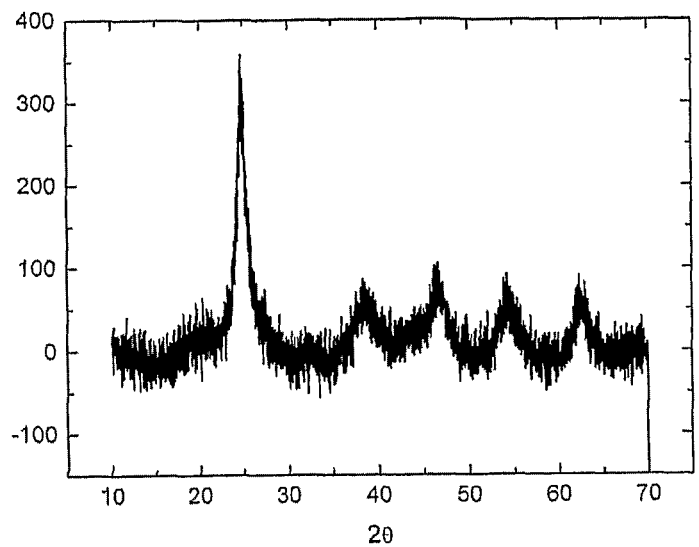
FIG. 4 shows the x-ray powder diffractograms of products with a Li:Ti ratio of 0.82, which were prepared at room temperature.
Figure 4:
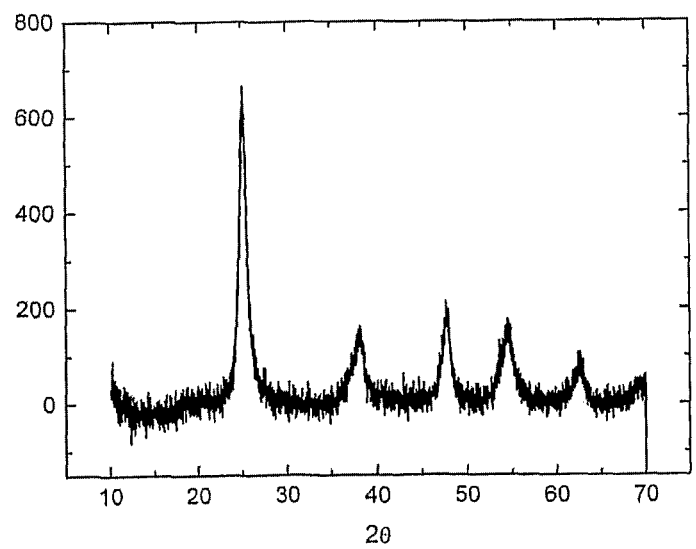
Figure 5:
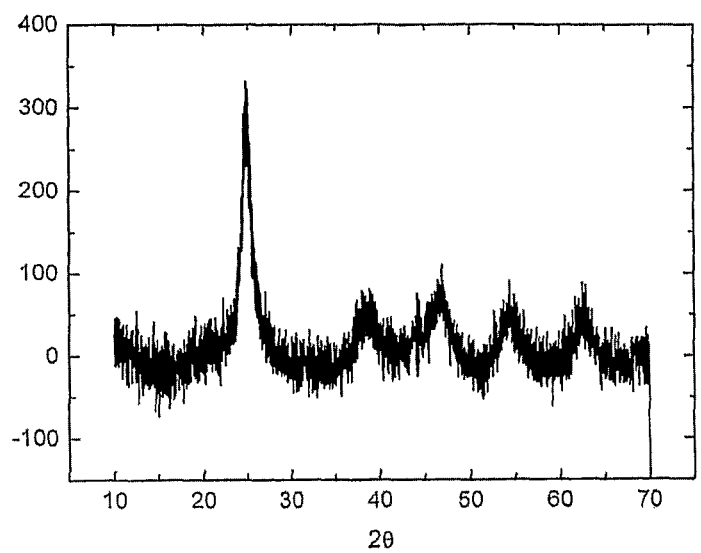
FIG. 5 shows the x-ray powder diffractograms of products with a Li:Ti ratio of 0.82, which were prepared at a temperature of 60° C.
Figure 5:
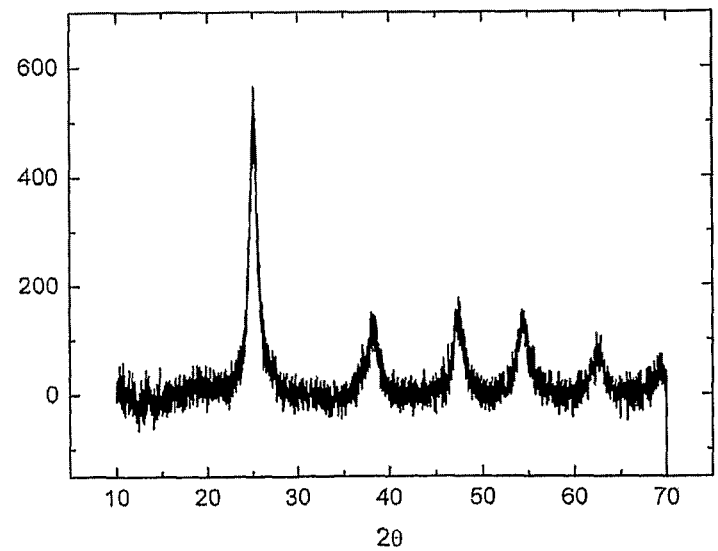
Figure 6:
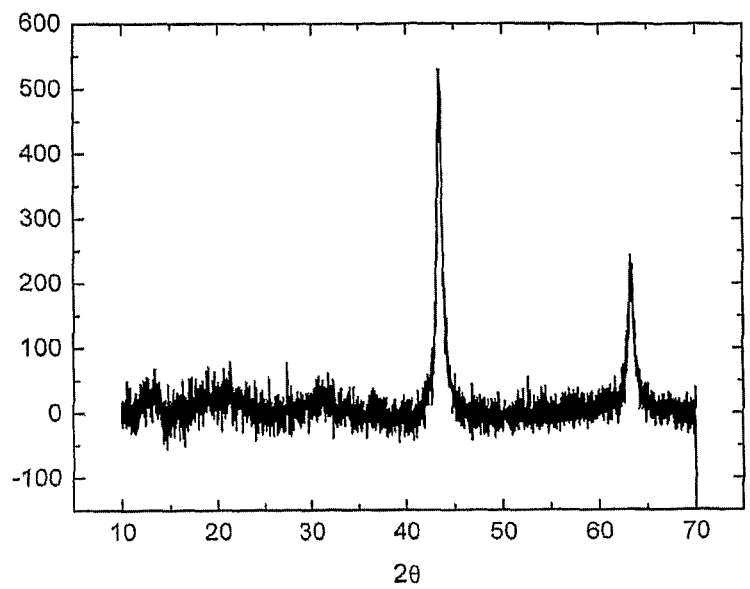
FIG. 6 shows the x-ray powder diffractograms of products with a Li:Ti ratio of 2.0, which were prepared at room temperature.
Figure 6:
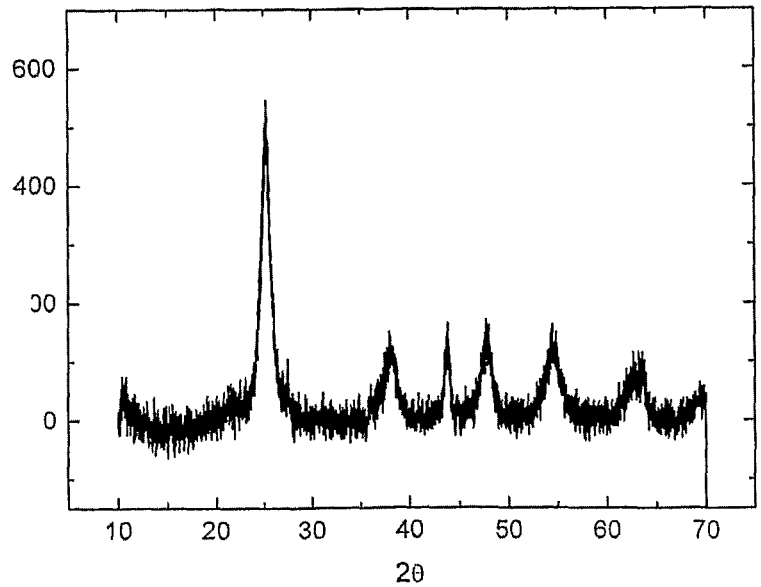
Figure 7:
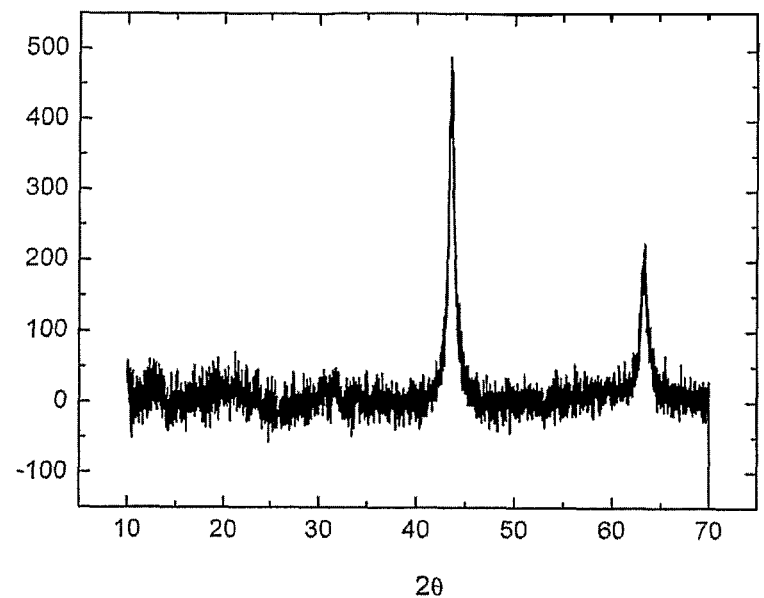
FIG. 7 shows the x-ray powder diffractograms of products with a Li:Ti ratio of 2.0, which were prepared at a temperature of 60° C.
Figure 7:
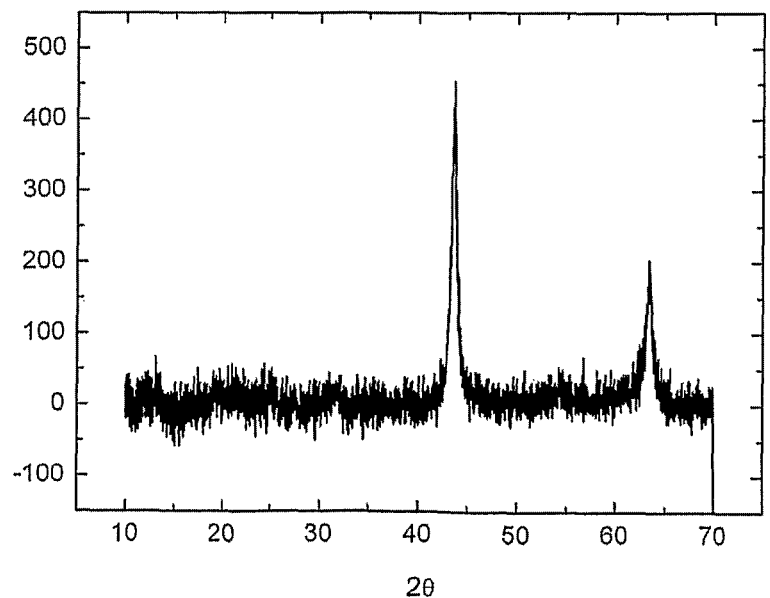

As in Example 1, X-ray diffraction analysis demonstrates the formation of crystalline lithium titanate with an average crystal size of about 25 nm in both samples. Peaks characteristic of anatase were not present in the diagrams. According to chemical analyses, these Li$_x$Ti$_y$O$_z$ samples have an Li:Ti molar ratio of 1.42 and 1.39, respectively, with the z:y molar ratio being 3.5 in both samples. The diffractograms for the products are presented in FIGS. 3 A (25 C) and B (60° C.).

The sample that had been reacted at 60° C. was processed further by washing it with plenty of water and drying at 105° C. until dry. Particle size and specific surface area were determined on an unwashed sample and Li, Ti, S and Cl concentrations and X-ray powder diffractogram and specific surface area on a washed sample (Table 3).

TABLE 3

| Analysis | Reacted at 60° C. 200° C. washed | Reacted at 60° C. 200° C. unwashed | Reacted at room temperature 200° C. unwashed |
|---|---|---|---|
| Li, % by weight | 7.5 | | |
| Ti, % by weight | 37 | | |
| Li/Ti, mol | 1.4 | | |
| Na, % | 0.45 | | |
| S, % | 0.01 | | |
| Cl % | <0.01 | | |
| Moisture content, % | 2.8 | | |
| Specific surface area [m$^2$/g] | 49.6 | 30.8 | 30.0 |
| Particle size distribution d$_{50}$ [µm] | | 6.04 | 10.63 |
| Particle size distribution d$_{90}$ [µm] | | 34.39 | 47.80 |

The product that was reacted at room temperature and the one reacted at 60° C. provided identical X-ray powder diffractograms. Elevation of the temperature did not enhance the formation of the compound. Longer processing time was observed to slightly reduce the size of the lithium titanate crystal. The X-ray powder diffractogram yields a crystal size of 22 nm. No anatase peak is found in the diagrams. The example indicates that the reaction with sodium titanate was achieved at a temperature as low as 25° C.

Example 3

The washed titanium dioxide hydrate material from Example 1 is elutriated in water so that the concentration of the slurry, expressed as titanium dioxide, was about 300 g/l. The slurry was heated to 60° C. and the pH was adjusted to 6.4 with sodium hydroxide. The slurry was processed at 60° C. under continuous agitation for 120 minutes. The pH was kept constant (6.4) throughout the treatment. The precipitate was filtered and washed with plenty of warm water. A small amount of the obtained cake was dried at 105° C. According to analyses, the dried cake had a sodium concentration of 68 mg/kg and a sulphur concentration of 0.11% by weight.

The rest of the cake as re-elutriated in water to a density of 300 g/l. The slurry was divided into four parts (Samples 1 to 4). Solid lithium hydroxide (LiOH.H$_2$O) was added to each part and they were treated according to Table 4.

TABLE 4

| Sample | Amount of LiOH•H$_2$O added per 50 g of TiO$_2$ | Li/Ti mol | Treatment |
|---|---|---|---|
| 1 | 21.5 | 0.82 | agitation at room temperature overnight |
| 2 | 21.5 | 0.82 | agitation at 60° C. overnight |
| 3 | 52.5 | 2.0 | agitation at room temperature overnight |
| 4 | 52.6 | 2.0 | agitation at 60° C. overnight |

The samples were filtered and the obtained cakes were further divided into two parts, with one part being washed with plenty of water and dried at 200° C. The other part was dried unwashed at the same temperature. The X-ray diffractograms of all sample powders were determined in the two-theta angle range of 10-70°. In addition, the specific surface area, particle size, chemical analyses of the components Li, Ti, Na; and SEM and TEM images of the washed and dried sample powders were determined.

The specific surface area was found to be 123 m2/g (NOVA 3200 High Speed Gas Sorption Analyzer, Quantachrome Corp.)

Particle size distribution parameters: d50=1.5 μm, d10=0.8 μm and d90=2.7 μm.

Chemical analyses yield Li 9.1% by weight; Ti 43.7% by weight and Na<1.0% by weight; Li/Ti=1.42

According to X-ray diffraction analyses, the crystal forms were as presented in Table 5.

TABLE 5

| Sample | Crystal forms | FIG. |
|---|---|---|
| 1 unwashed | $TiO_2$ (anatase) | 4 A |
| 1 washed | $TiO_2$ (anatase) | 4 B |
| 2 unwashed | $TiO_2$ (anatase) | 5 A |
| 2 washed | $TiO_2$ (anatase) | 5 B |
| 3 unwashed | $TiO_2$ (anatase) + $Li_xTi_yO_z$ | 6 A |
| 3 washed | TiO2 (Anatase) + LixTiyOz | 6 B |
| 4 unwashed | LixTiyOz | 7 A |
| 4 washed | LixTiyOz | 7 B |

This example indicates that the reaction was also achieved using titanium dioxide hydrate material, but this requires a slightly higher reaction temperature than in the previous example.

Example 4

The washed titanium dioxide hydrate material described in Example 1 was elutriated in water so that the concentration of the slurry, expressed as titanium dioxide, was about 300 g/l. The slurry was heated to 60° C. and its pH adjusted to 6.4 with sodium hydroxide. The slurry was agitated at 60° C. for 120 minutes. The pH was kept constant (6.4) throughout the treatment. The precipitate was filtered and washed with plenty of warm water. A small amount of the filtrate cake was dried at 105° C. for analysis. According to analyses, the dried cake had a sodium concentration of 91 mg/kg and a sulphur concentration of 0.081% by weight.

The rest of the cake was re-elutriated in water to a density of 300 g/l. The obtained slurry was divided into two parts.

Solid lithium hydroxide (LiOH.H2O) was added to the first part at 39.4 g/50 g $TiO_2$ (Li/Ti molar ratio 1.5). The slurry thus created is agitated at 50° C. for 40 minutes. The slurry was dried in a vertical furnace at 200° C.

Solid lithium hydroxide (LiOH.H2O) was added to the second part at 52.5 g/50 g $TiO_2$ (Li/Ti molar ratio 2.0). The slurry thus created was agitated at 60° C. for 90 minutes. The slurry was dried in a vertical furnace at 200° C.

Figure 8:
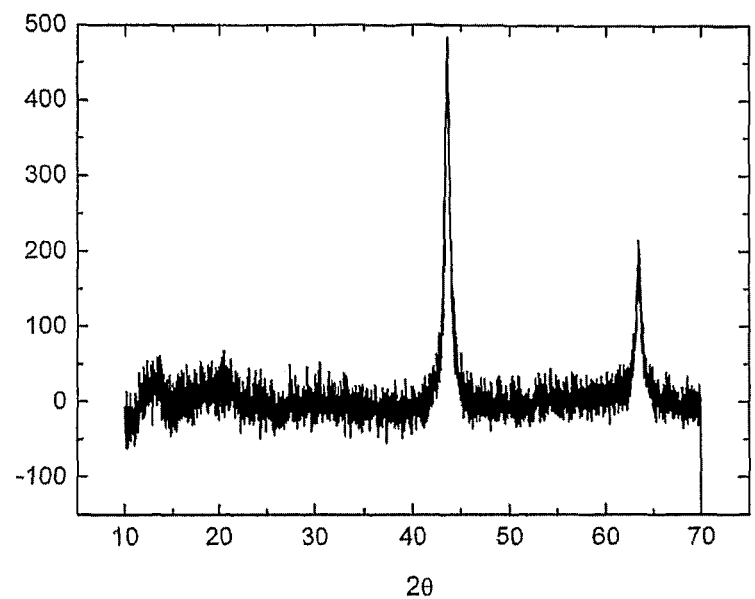
FIG. 8 shows the x-ray powder diffractograms of products with a Li:Ti ratio of 1.5 and 2.0, which were prepared under the conditions of 50° C. for 40 min, and 60° C. for 90 min.
Figure 8:
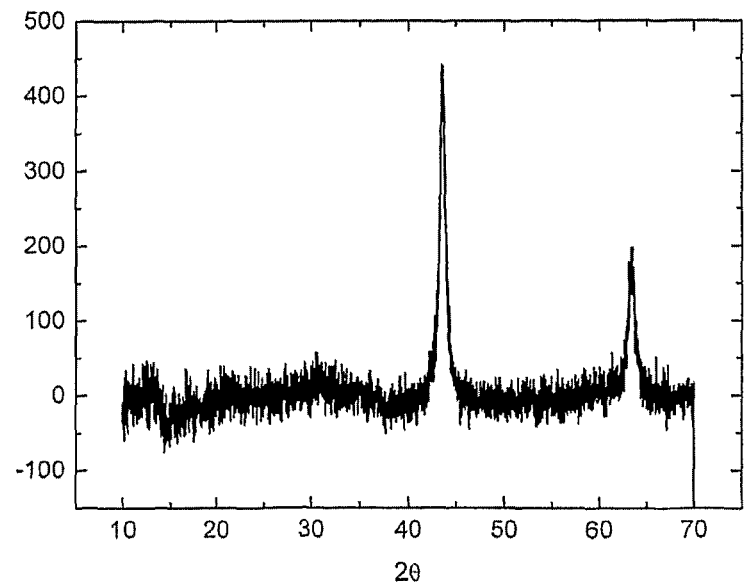

X-ray powder diffractograms are measured on the dried powders in the two-theta angle range of 10-70°. According to the X-ray diffraction analyses, only the $LiTiO_2$ crystal form was evident in both samples (FIGS. 8 A (1.5) and B (2.0)).

These samples that were dried at 200° C. were further washed with plenty of water and re-dried at 105° C. The Li, Ti and Na contents of the washed and dried powders were analysed. The results are presented in Table 6.

TABLE 6

| | Part 1 (% by weight) | Part 2 (% by weight) |
|---|---|---|
| Li | 8.5 | 9.3 |
| Ti | 38 | 38 |
| Na | 0.020 | 0.010 |
| Li/Ti mol | 1.5 | 1.7 |
| O/Li (mol) | 3.6 | 3.6 |
| Specific surface area [$m^2$/g] | 126.8 | 111.5 |
| Particle size distribution $d_{50}$ [μm] | 1.49 | 1.49 |
| Particle size distribution $d_{90}$ [μm] | 2.43 | 2.44 |

Example 5

Lithium titanate was produced according to Example 1, except that solid lithium hydroxide (LiOH.H2O) was added to neutralized, washed titanium dioxide hydrate material in an Li/Ti molar ratio of 1.5 and the obtained mixture was agitated at 50° C. for 90 minutes.

Part of the product was dried, without washing, at 60° C. at normal pressure and another part at 25° C. in vacuum.

Figure 10:
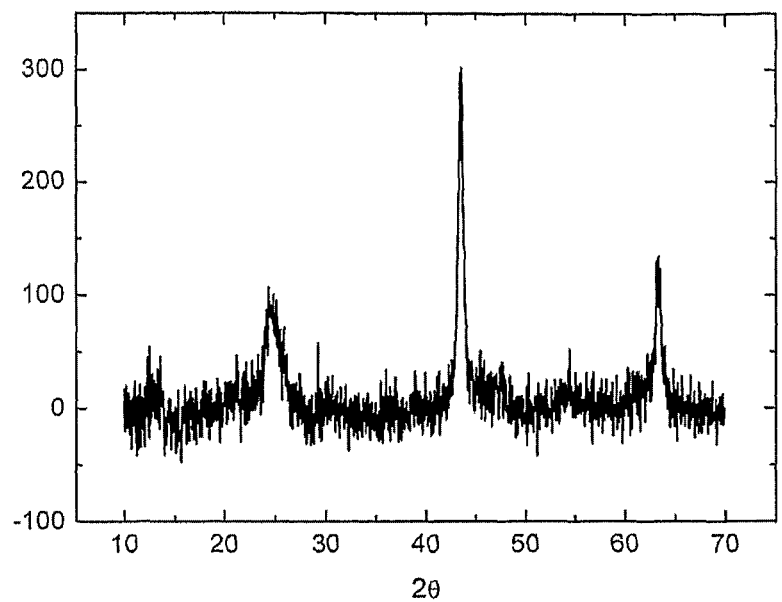
FIG. 10 shows the x-ray powder diffractograms of a product that was dried at room temperature (A) and at 60° C. (B).
Figure 10:
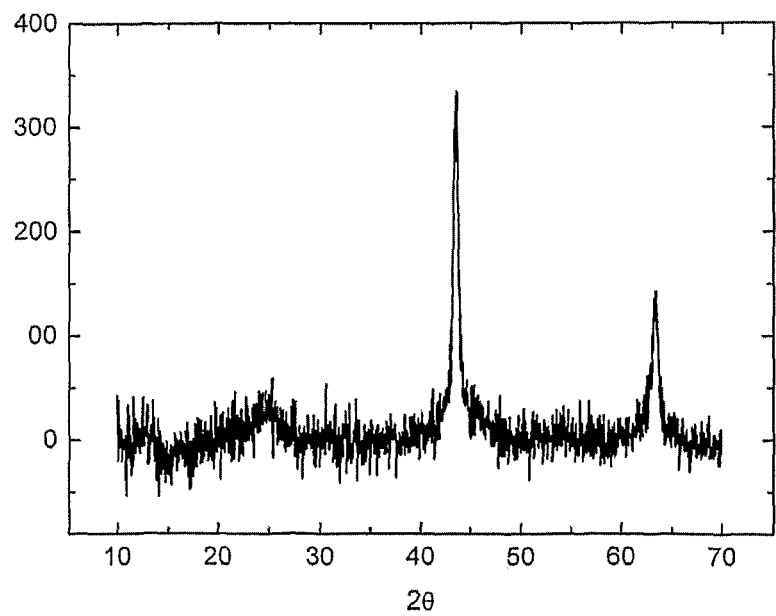
Figure 11:
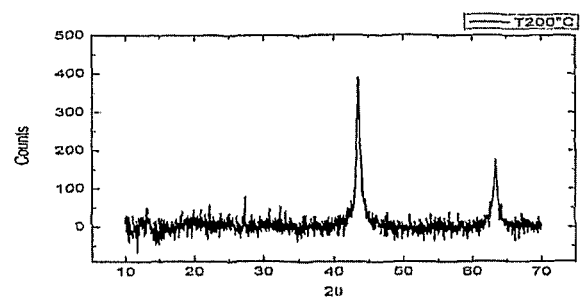
FIG. 11 shows the effect of the calcination temperature on the crystal size of the product.
Figure 11:
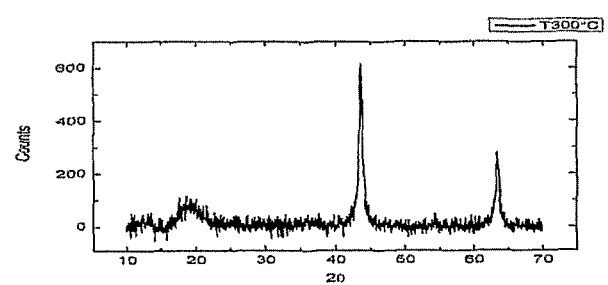
Figure 11:
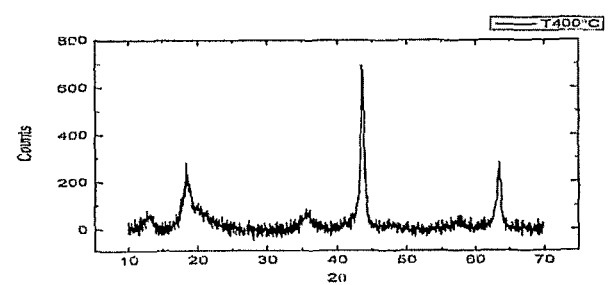
Figure 11:
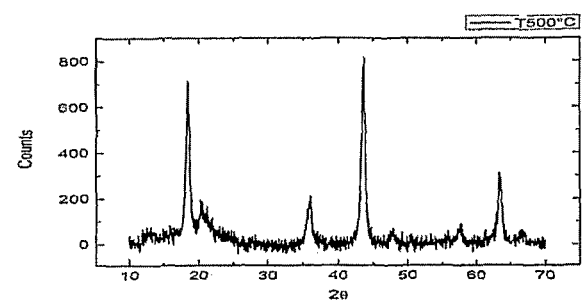

XRD was measured on both products after drying (FIGS. 10 A and B). It can be seen from the X-ray diffractograms that there was still some starting material left in the sample dried at room temperature and the sample dried at 60° C. was almost free of starting material.

The sample dried at 60° C. was divided into four parts which were then calcined at 200° C., 300° C., 400° C. and 500° C. for 90 minutes. XRD was then measured on the calcined sample (FIGS. 11A-D, respectively). It can be seen from the X-ray diffractograms that the samples contain reflections characteristic of the cubic lithium titanate in accordance with the invention. In addition, an incipient change in crystal structure was evident at higher temperatures.

The invention claimed is:

1. A process of preparing alkali metal titanate, comprising the steps of:
    i) mixing an aqueous, titanium-containing slurry with an alkali metal compound to form a mixture;
    ii) allowing the mixture to react at a temperature of 20-100° C. by agitating it at normal pressure for 20 hours maximum to form an alkali metal titanate solution; and
    iii) drying the alkali metal titanate solution of step ii) to form a dried crystalline alkali metal titanate product.

2. The process according to claim 1, wherein the mixture is allowed to react to form the alkali metal titanate at a temperature of less than 75° C.

3. The process according to claim 1, wherein the mixture is allowed to react to form the alkali metal titanate at a temperature greater than 30° C. minimum.

4. The process according to claim 1, wherein the alkali metal compound is an alkali metal hydroxide in solid form.

5. The process according to claim 1, wherein the mixture is allowed to react to form the alkali metal titanate for a period of less than 3 hours.

6. The process according to claim 1, wherein the aqueous titanium-containing slurry contains sodium titanate.

7. The process according to claim 6, wherein the sodium titanate is prepared by reacting a titanium dioxide hydrate originating from a sulphate process in the production of titanium dioxide with alkali.

8. The process according to claim 7, wherein the sodium titanate is prepared by a process comprising the steps:
    i) elutriating titanium dioxide hydrate from ilmenite concentrate in water to a density of 300-400 g/l resulting in a titanium dioxide hydrate slurry,
    ii) boiling said titanium hydrate slurry with alkali at a pH above 11 resulting in a sodium titanate slurry, iii) washing out soluble sulphate salts from said sodium titanate slurry, and iv) filtering thus obtained sodium titanate slurry.

9. The process according to claim 6, wherein the sodium titanate is elutriated in water into a slurry with a density of 100-800 g/l.

10. The process according to claim 1, wherein the aqueous titanium-containing slurry is prepared from titanyl chloride originating from a sulphate process in the production of titanium dioxide.

11. The process according to claim 10, wherein the aqueous titanium-containing slurry is prepared by precipitating or hydrolysing titanyl chloride originating from a sulphate process in the production of titanium dioxide.

12. The process according to claim 1, wherein the aqueous titanium-containing slurry is prepared by a process comprising the steps:

i) thermally hydrolysing titanyl chloride, originating from an ilmenite concentrate of a sulphate process in the production of titanium dioxide, with sulphuric acid into titanium dioxide hydrate, and ii) elutriating the resulting titanium dioxide hydrate in water to form a titanium dioxide hydrate slurry with a density of 300-400 g/l.

13. The process according to claim 1, further comprising heat-treating the dried alkali metal titanate product at a temperature of 500-1050° C., and rendering the crystal structure of the dried alkali metal titanate product tetragonal.

14. The process according to claim 1, wherein the alkali metal hydroxide and the aqueous titanium-containing slurry have a molar ratio of alkali metal:Ti of 1.1-2.0.

* * * * *